United States Patent

Emmrich et al.

(10) Patent No.: US 6,514,387 B1
(45) Date of Patent: Feb. 4, 2003

(54) RECTIFYING COLUMN FOR EXTRACTIVE DISTILLATION OF CLOSE-BOILING OR AZEOTROPIC BOILING MIXTURES

(75) Inventors: Gerd Emmrich, Essen (DE); Bärbel Kolbe, Witten (DE); Helmut Gehrke, Essen (DE); Frank Ennenbach, Essen (DE); Uwe Ranke, Essen (DE)

(73) Assignee: Krupp Uhde GmbH, Dortmund (DE)

( * ) Notice: Subject to any disclaimer, the term of this patent is extended or adjusted under 35 U.S.C. 154(b) by 0 days.

(21) Appl. No.: 09/582,596

(22) PCT Filed: Oct. 1, 1999

(86) PCT No.: PCT/EP99/07285

§ 371 (c)(1),
(2), (4) Date: Aug. 1, 2000

(87) PCT Pub. No.: WO00/25881

PCT Pub. Date: May 11, 2000

(30) Foreign Application Priority Data

Oct. 29, 1998 (DE) .......................................... 198 49 651

(51) Int. Cl.[7] .............................. B01D 3/36; B01D 3/40
(52) U.S. Cl. .................. 202/153; 202/155; 202/158; 202/168; 202/169; 202/172; 196/111; 203/50; 203/45; 203/46; 203/78; 203/DIG. 9; 585/802
(58) Field of Search ................................. 202/152, 168, 202/153, 169, 154, 170, 155, 156, 157, 158, 172; 203/78, 50, 100, 43, 46, 45, DIG. 9; 422/191, 193; 196/111; 585/802

(56) References Cited

U.S. PATENT DOCUMENTS

| | | |
|---|---|---|
| 2,366,360 A | 1/1945 | Semon |
| 3,412,016 A | 11/1968 | Graven |
| 3,477,915 A | * 11/1969 | Gantt et al. .................. 202/155 |
| 3,881,994 A | 5/1975 | Fickel |
| 5,308,592 A | * 5/1994 | Yang et al. .................. 202/158 |
| 5,339,648 A | 8/1994 | Lockett et al. |
| 5,755,933 A | * 5/1998 | Ognisty et al. ............. 196/100 |

FOREIGN PATENT DOCUMENTS

| | | |
|---|---|---|
| DE | 33 27 952 | 2/1985 |
| DE | 195 45 915 | 6/1997 |
| EP | 0 133 510 | 2/1985 |
| EP | 0 216 991 | 5/1986 |
| EP | 0 684 060 | 11/1994 |
| GB | 1075208 | 7/1967 |
| JP | 09299702 | * 11/1997 |
| JP | 99.56848 | * 11/1999 |

OTHER PUBLICATIONS

Ullman's Encyclopedia of Technical Chemistry, vol. 2, 4th edition, pp. 511 and 512.

* cited by examiner

Primary Examiner—Virginia Manoharan
(74) Attorney, Agent, or Firm—Collard & Roe, P.C.

(57) ABSTRACT

The invention relates to a rectifying column for extractive distillation, comprising a column main section (204) and a raffinate section (205) above said main section, an evaporator (208) situated on the lower end of the column, an inlet (214) disposed between the main section of the column and the raffinate section and a solvent inlet (215) arranged on the top side of the raffinate section (205) for feeding an extracting agent. According to the invention, the main section (204) has two chambers (216, 217) connected in parallel. A stripping section (222) is disposed between the bottom of the column (221) and the main section (204), in which concentration of the extracting agent occurs from the top down. The bottom (221) is connected to the solvent inflow (215) by a device (223) for recycling the extracting agent.

6 Claims, 3 Drawing Sheets

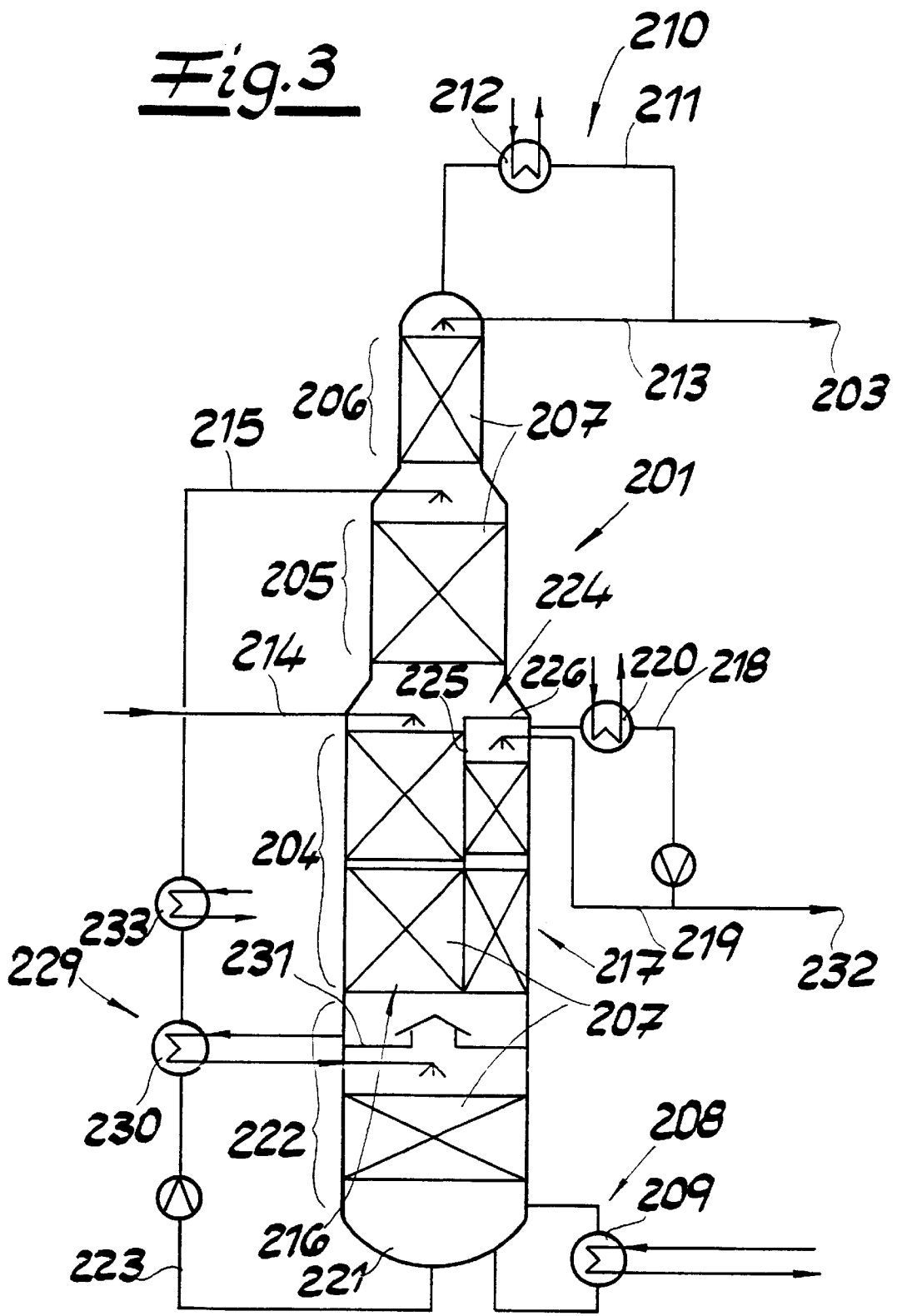

RECTIFYING COLUMN FOR EXTRACTIVE DISTILLATION OF CLOSE-BOILING OR AZEOTROPIC BOILING MIXTURES

The invention relates to a rectifying column for the extractive distillation of close-boiling or azeotropic boiling mixtures, comprising
 a column main section and a raffinate section located above said column main section;
 an evaporating device located at the lower end of the column and having at least one evaporator;
 an arrangement on the cap of the column with a raffinate outlet, a condenser and a device for partially recycling the raffinate liquefied in the condenser;
 an inlet located between the main section of the column and the raffinate section for charging a starting mixture to be separated; and
 a solvent inlet located at the top side of the raffinate section for feeding an extracting agent.

In addition to the column described above, known installations for extractive distillation have a second rectifying column in which the sump product withdrawn from the first column is separated into pure extracting agent and a pure product current (ULLMANN's Encyclopedia of Technical Chemistry, volume 2, $4^{th}$ edition, page 511; EP-B 0 216 991). The extracting agent is collected in the sump of the second column and is recycled into the solvent inlet of the first column. A pure product current, hereinafter also referred to as the extract, is withdrawn at the cap of the second column. The second column required within the framework of the known measures for recovering the extracting agent has a column section located above the inlet, said section being designed as an updraft part with a plurality of theoretical separating trays; a column "shoot" designed as the updraft part located below the inlet; a sump heating system; as well as an arrangement on the cap of the column comprising a product outlet, a condenser and a device for partially recycling the product liquefied in the condenser.

The space required for installing a distilling plant with two columns including the pipeline system associated therewith upstream is quite considerable and is in some cases not available when such a distilling apparatus needs to be installed in an existing chemical plant.

A rectifying column for extractive distilling is known from DE-A-33 27 952 which permits separating an azeotropic two-substance mixture into its individual components. Said rectifying column has a column main section with two chambers connected in parallel, whereby one chamber is open at the top and bottom sides and can be designed as the stripping part for separating the raffinate from the mixture containing the extracting agent. The other chamber is closed against the interior space of the column at the top side and open only at the bottom side. A product that is substantially free of extracting agent can be withdrawn from said chamber via a side outlet. Furthermore, the sump of the column at the bottom end of the column is connected with the solvent-feeding inlet by a device for recycling the extracting agent.

The invention is based on the problem of further developing a rectifying column with the structure known from DE-A-33 27 952 in such a way that the amounts of stripping steam required for the separation processes can be admitted into both chambers, and that the extracting agent can be recycled from the sump of the column into the inlet of the solvent with high purity.

The object of the invention and the solution of the problem is a rectifying column for the extractive distillation of close-boiling or azeotropic boiling mixtures, comprising a column main section having two chambers connected in parallel;
 a raffinate section located on top of the column main section;
 an evaporating device located at the lower end of the column and having at least one separator;
 an arrangement at the cap of the column comprising a raffinate outlet, a condenser and a device for partly recycling the raffinate liquefied in the condenser;
 an inlet located between the column main section and the raffinate section for feeding a starting mixture to be separated; and
 a solvent inlet at the top side of the raffinate section for feeding an extracting agent;
 whereby one chamber of the column main section is open at the top and bottom sides, contains installations for improving the substance exchange, and is designed as a stripping section with a plurality of theoretical separation stages for separating the raffinate from the mixture containing the extracting agent; whereby the other chamber of closed at the top side versus the interior of the column and is open at the bottom side, contains installations for promoting the material exchange, and, in a space located above said installations, has devices for withdrawing a substantially extracting agent-free, gaseous product as well as for refluxing a liquefied partial product stream; and whereby the sump of the column is connected at the lower end of the column with the solvent inlet by a device for recycling extracting agent; and whereby, furthermore, the following features are realized according to the invention:
 a column stripping section with a plurality of theoretical separation stages is arranged between the sump of the column and the column main section, with the extracting agent being concentrated in said stripping section from the top down;
 a catching tray is arranged below the column main section, said catching tray being permeable to gas and having its outlet for liquid connected to a continuous-flow flow heater for heating the liquid draining from the two chambers of the column main section;
 the heated mixture exiting from the continuous-flow heater can be fed below the catching tray into the stripping section of the column.

According to a preferred embodiment of the invention, the continuous-flow heater is heated by heat exchange with the stream of extracting agent withdrawn from the sump of the column.

The instruction according to the invention reduces the plant for extractive distilling to one single column, where sections for the recovery of the extracting agent as well as for concentrating the extract are integrated. The extracting agent is charged above the raffinate section. A portion of the components of the starting mixture preferably dissolves as extract and is washed out from the stream of extracting agent in the raffinate section. The other portion of the starting mixture passes as gaseous raffinate to the cap of the column. In the chamber of the column main section that is open at the top and bottom sides, the dissolved raffinate component is concentrated by vapor stripping. The mixture exiting on the bottom side of said chamber substantially consists of the extracting agent and the extract dissolved therein and still only traces of the dissolved raffinate in most cases. In the column stripping section that is located below said chamber, the extract is stripped from the extracting agent by vapor stripping. A partial stream of the vapors rising in the column enters the chamber of the column main section that is open at the top and bottom sides and strips the raffinate in said chamber. Another part stream enters the second chamber of the column main section that is closed against the interior space of the column. In said chamber, which is referred to in the following also as the product section, the concentration of the extracting agent that rises together with the product vapors according to the solvent partial pressure, is reduced by product reflux and passed with the product reflux into the column stripping section. In the sump of the column, the extracting agent is collected substantially in the pure form. It is cooled and recycled into the solvent inlet above the raffinate section.

It is within the scope of the invention that the column main section consists of two independent column passages which are substantially arranged next to each other and connected at their lower ends with the column stripping section by a distributor. However, the column main section is preferably designed in the form of a cylindrical column passage that is installed between a column section forming the raffinate section, and the column stripping section, and which contains an insert forming the chamber that is closed at the top side. The insert can have a cylindrical shape and it can be arranged in the center. However, a preferred solution that is simpler in terms of plant engineering is that the insert consists of a partition that is connected with the jacket of the column passage and extends in the longitudinal direction of the column, and a cover that is connected with the partition and a jacket segment of the column passage. The partition divides the cross sections of the column passage in two sections. The division of the sections is dependent upon how the rising vapors have to be divided and allocated to the two chambers.

Between the raffinate section and the column main section, provision is usefully made for a catching tray for liquid, said tray being permeable to gas, whereby a liquid distributor is connected with the catching tray. Said distributor feeds the draining liquid to the installations in the chamber of the column main section that is open at the top side.

Above the raffinate zone, the rectifying column as defined by the invention may have a column section for raffinate stripping, said section extending from the solvent inlet up to the cap of the column and usually having a plurality of theoretical separation stages.

The rectifying column as defined by the invention permits extractive distillation within a confined space. This is advantageous, for example when additional apparatus for extractive distilling has to be installed in an existing chemical plant for expanding the production capacity. It has been surprisingly found that the rectifying column as defined by the invention not only requires substantially less space than a distilling plant with two columns according to the prior art, but also distinctly reduces the energy requirements without any change in the through-put capacity, product purity and product yield.

BRIEF DESCRIPTION OF THE DRAWINGS

The invention is explained in the following with the help of the drawing showing only one exemplified embodiment. In the drawing.

FIG. 3 shows a further developed rectifying column as defined by the invention.

Figure 1:
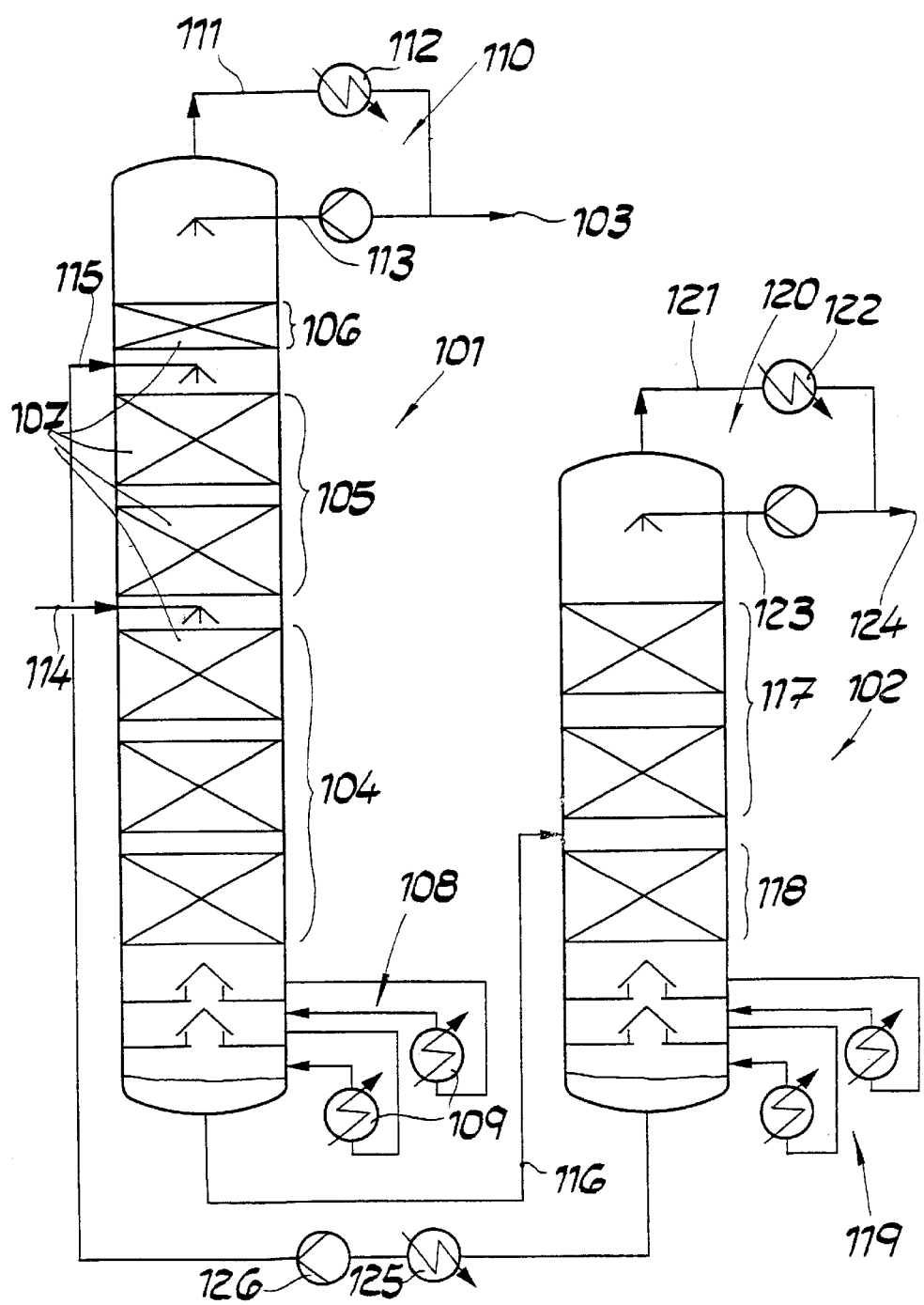
FIG. 1 shows a diagram of a plant according to the prior art for the extractive distillation of close-boiling or azeotropic boiling mixtures.

A plant for extractive distillation of close-boiling or azeotropic boiling mixtures according to the prior art consists of two interconnected columns 101, 102 (FIG. 1). The first column 101, in which a cap product 103 is separated into the pure form, has a column main section 104 extending from the bottom to the top; a raffinate section 105; as well as a column section 106 for purifying the raffinate. The column sections contain the installations 107 for promoting the material exchange between the vapor and liquid phases, for example in the form of structured packings. The installations 107 each form a plurality of theoretical separation stages. At the bottom end of the column, provision is made for an evaporating device 108 with the two continuous-flow evaporators 109, which are arranged one on top of the other in the present exemplified embodiment. The cap of the column has an arrangement 110 comprising the raffinate outlet 111, the condenser 112, as well as the device 113 for partly recycling the raffinate liquefied in the condenser 112.

The hydrocarbon mixture to be separated, for example in mixture of aromatics/non-aromatics, olefins/paraffins, or olefins/paraffins/diolefins, is fed into the column via an inlet 114 located between the column main section 104 and the raffinate section 105. An extracting agent, for example a polar solvent for separating hydrocarbon mixtures, is charged at the top side of the raffinate section 105 via a solvent inlet 115. At the head of the column, a head product (raffinate) with a low content of aromatics or olefins/diolefins is withdrawn in the form of vapor, and then condensed with water and cooled down in the condenser 112. A portion of the condensate is recycled into the column 101 and serves there for re-washing traces of extracting agent, which exits from the column 101 together with the raffinate according to its partial pressure. The vapors that are required both for evaporating the raffinate and for stripping the impurities in the lower part of the column, are generated by means of the electrically heated evaporators 109. A mixture is collected in the sump of the column 101 that substantially consists of the extracting agent and aromatics, olefins or diolefins. Via a conduit 116, the sump mixture passes into the second column 102, which is referred to in the following as the stripping column. The stripping column 102 has an updraft section 117 located above the inlet 116, as well as a stripping section 118 below the inlet 116, and also contains the installations 107 for promoting the material exchange, for example in the form of structured packings. The stripping column 102 is equipped with the sump heating system 119 and has an arrangement on the cap side for withdrawing gaseous cap product and for condensing the latter and for recycling part of said cap product into the column 102. The sump heating system 119 consisting of, for example two evaporators with forced flow-through, evaporates the hydrocarbon product to be separated, and part of the extracting agent. The vapors exit from the column via a conduit 121, and are then condensed with water and cooled down in a condenser 122 downstream. A portion of the condensate is recycled into the column 102 via a reflux conduit 123 and serve there for re-washing traces of the extracting agent. The remainder is discharged as pure product via a conduit 124. The stripped extracting agent is withdrawn at the sump of the stripper column 102, cooled with water in a heat exchanger 125 to a temperature required for extractive distillation, and recycled into the first column 101 via an extracting-agent recycling conduit 126.

Figure 2:
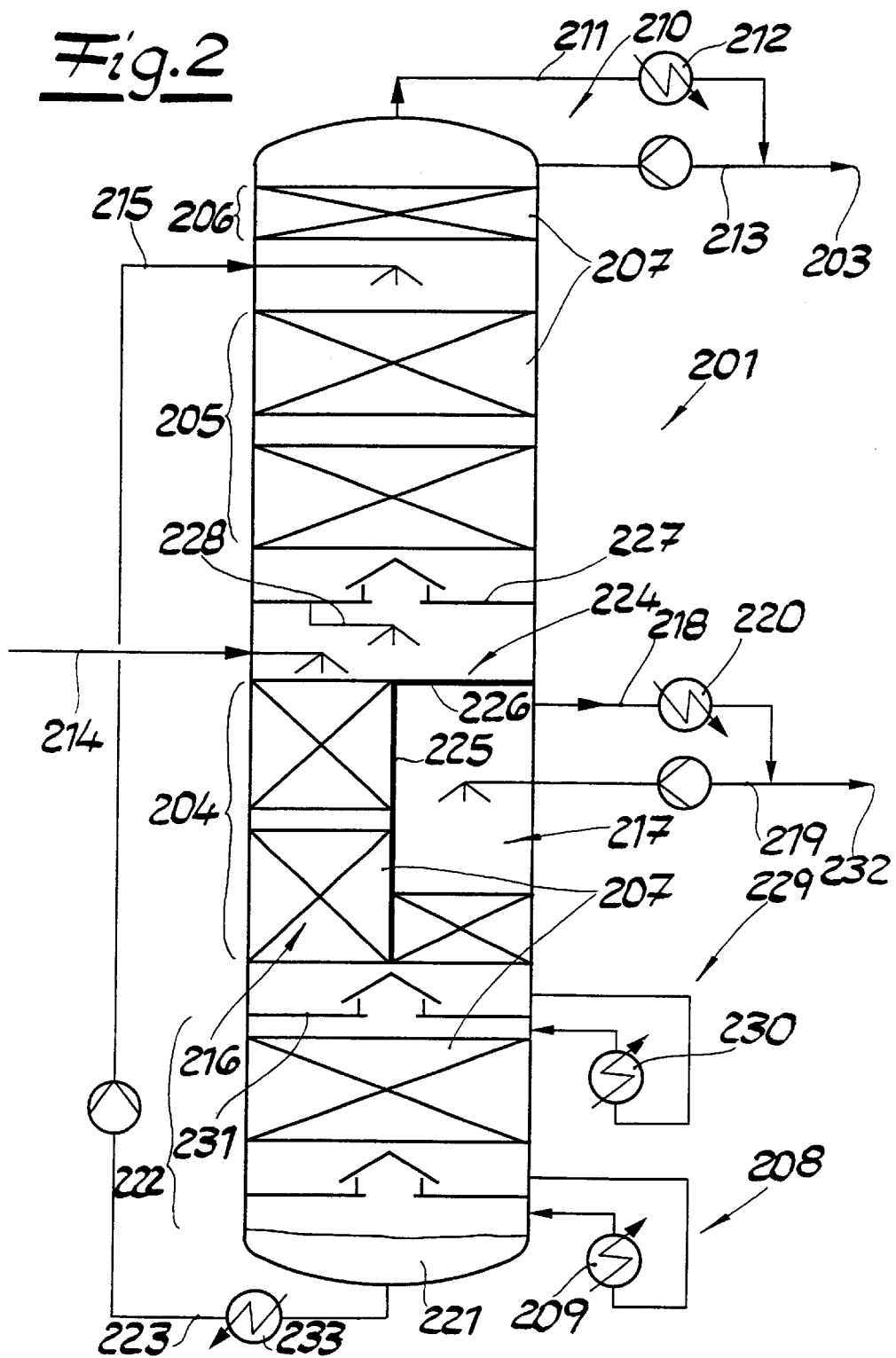
FIG. 2 shows a rectifying column for extractive distillation as defined by the invention.

The rectifying column 201 as defined by the invention, which is shown in FIG. 2, also has a column main section 204 extending from the bottom to the top, a raffinate section 205, as well as a column section 206 above the raffinate section, said section 206 serving for purifying the raffinate. The column sections 204, 205 and 206 contain the installations 207 for promoting the material exchange between the vapor and the liquid phases, for example in the form of structured packings. At the bottom end of the column, provision is made for an evaporating device 208 with at least one evaporator 209. At the head of the column it is possible to see an arrangement 210 with the raffinate outlet 211, the condenser 212 as well as a device 213 for partly recycling the raffinate liquefied in the condenser 212. The substance mixture to be separated, for example an aromatics/non-aromatics mixture, an olefin/paraffin mixture or an olefin/paraffin/diolefin mixture is charged via an inlet 214 located between the column main section 204 and the raffinate section 205. The extracting agent is added via a solvent inlet 215 located on the top side of the raffinate section 205. The structure of the rectifying column 201 corresponds with the prior art to the above extent.

According to the invention, the column main section 204 has the two chambers 216, 217, which are connected in parallel. The one chamber 216 is open at the top and bottom sides; it contains the installations 207 for enhancing the substance exchange between the vapor and the liquid phases; and it is designed in the form of a stripping part with a plurality of theoretical separation stages for separating the raffinate from the mixture containing the extracting agent. The other chamber 217 is closed on the top and open on the bottom side. It also contains the installations 207 for promoting the substance exchange between the vapor and liquid phases. In a space located on top of the installations 207, provision is made for devices for withdrawing the gaseous product in the form of a substantially extracting agent-free extract, as well as for the reflux of a partial product stream that has been liquefied in a condenser 220. Furthermore, according to the invention, a column stripping section 222 is arranged between the column sump 221 and the column main section 204, in which concentration of the extracting agent takes place from the top down. The column stripping section 222 contains the installations 207, which form theoretical separation stages. The column sump 221 is connected with the solvent inlet 215 via a device 223 for recycling extracting agent.

The column main section 204 is designed in the form of a cylindrical column passage, which is installed between a column section forming the raffinate section 205, and the column stripping section 222, and which contains an insert 224 forming the chamber 217 that is closed at the top side. In the present exemplified embodiment, the insert 224 consists of a partition 225, which is connected with the jacket of the column passage and extends in the longitudinal direction of the column, and a cover 226 that is connected with the partition 225 and a jacket segment of the column passage. A catching tray 227 for collecting liquid, said tray being permeable to gas, is arranged above the column main section 204. The liquid collecting on the catching tray 227 is fed into the installations 207 of the chamber 216 of the column main section 204, said chamber being open at the top, by a liquid distributor 228, namely together with the starting mixture that is fed via the inlet 214.

A device 229 for heating the liquid draining from the two chambers 216 and 217 of the column main section 204 is arranged between the column stripping section 222 and the column main section 204. Said device 229 has a continuous-flow heater 230. A catching tray 231 with a liquid drain connected with the continuous-flow heater 230 is arranged below the column main section 204, said collecting tray being permeable to gas. The heated mixture exiting from the continuous-flow heater 230 can be fed into the stripping section 222 of the column below the catching tray 230.

The upper column section 206, which extends from the solvent inlet 215 up to the head of the column 201, serves for the purification of the raffinate. Liquid reflux raffinate is charged at the head, whereby residual amounts of extracting agent are separated from the vapor current by substance exchange with the rising vapors. A raffinate loaded with extracting agent is collected in the liquid state at the lower end of said column section 206. Said liquid raffinate is mixed with the extracting agent fed via the solvent inlet 215 and then admitted into the raffinate section 205. The liquid draining from the bottom side of the raffinate section 205 and the charged mixture 214 to be separated are jointly fed into the chamber 216 that is open at the top and bottom sides, said chamber forming the stripping part of the column main section 204. The liquid exiting from the stripping chamber 216 of the column main section 204 substantially consists of extracting agent and the extract carried along by the extracting agent, for example aromatics, olefins, diolefins. Said liquid is mixed with the liquid exiting from the second chamber 217 of the column main section 204 on the underside, said liquid having a lower content of extracting agent, and then fed into the column stripping section 222 adjoining the underside after it has been heated by means of the device 229. A sump product is collected by means of substance exchange with rising vapor that substantially consists of pure extracting agent. The vapor rising from the column stripping section 222, said vapor being enriched with extract, enters in the form of a partial stream the chamber 216 of the column main section 204 that is open at the top and bottom sides, and serves there for stripping the raffinate. The other part flows through the chamber 217 of the column main section 204 that is closed at the top side, whereby residual amounts of extracting agent are separated from the vapor by substance exchange with the liquid head product 219. Substantially pure extract vapor is withdrawn at the top end of the chamber 217 by means of the conduit 218 and liquefied in the condenser 220. A part stream is charged again in the column 201 via the reflux conduit 219 and the other part stream is discharged via the product conduit 232. The extracting agent collected in a substantially pure form at the bottom end of the column is passed through an evaporator 209 associated with the column sump 221, whereby a part stream is evaporated and rises as vapor into the column stripping section 222. Liquid extracting agent is withdrawn from the column sump 221, cooled in a heat exchanger 233 with cooling water to the temperature required for the separation process, and fed again into the column 201 via the solvent inlet 215.

In the embodiment of the rectifying column as defined by the invention and shown in FIG. 3, the continuous-flow heater 230 is heated by heat exchange with the stream of extracting agent withdrawn from the column sump 221. In a heat exchanger 233 connected downstream, the liquid extracting agent is subsequently cooled further to the temperature required for the separation process, and then recycled into the column 201 via the solvent inlet 215.

Many different application possibilities are available for the rectifying column as defined by the invention. Fractions of fully hydrated pyrolysis benzine, catalytic reformate or pressure-refined coking plant benzene can be used as the charged product. C4-fractions of steam crackers or FCC-crackers can be employed for producing butadiene and/or butenes. It is possible by means of the rectifying column as defined by the invention to produce isoprene and/or piperylene from C5-fractions of steam crackers or FCC-crackers. With the help of polar solvents employed as extracting agents it is possible to produce high-purity benzene from C6-fractions of fully hydrated pyrolysis benzine, reformate or pressure-refined coking plant benzene. From C6/C7-fractions of fully hydrated pyrolysis benzine, reformate or pressure-refined coking plant benzene it is possible to produce high-purity benzene and toluene with nitrating quality, using the rectifying column as defined by the invention. From C6/C7/C8-fractions of fully hydrated pyrolysis benzine, reformate or pressure-refined coking plant benzene it is possible by means of the rectifying column as defined by the invention to produce high-purity benzene, toluene with nitrating quality, and C8-aromatics. Finally, styrene with polymerizing quality can be produced from the C8-fraction of crude pyrolysis benzine. Polar solvents are suitable extracting agents for the separation of hydrocarbons. Extracting agents that have been successfully employed for extractive distillations, and which can be used also in the operation of the rectifying column as defined by the invention, include sulfolane, -methylpyrollidone, Dimethylacetamide, aceto-nitrile, dimethylsulfoxide, dimethylformamide, ethylene glycols, as well as mixtures of said substances. Furthermore, morpholine or N-substituted morpholines, if necessary also in mixture with the extracting agents specified above, can be used as extracting agents. Finally, water can be added to said extracting agents as well.

Comparative Tests

Comparative tests were carried out with the plant shown in FIG. 1 and the rectifying column shown in FIG. 2. The two columns 101, 102 of the plant designed according to prior art according to FIG. 1 each had a diameter of 72 mm and contained structured packings. The packing height in the first, extractively operating distilling column 101 came to a total height of 5.5 m with the following division of the structured packings:

| | |
|---|---|
| Column main section (104) | 3 m packing height |
| Raffinate section (105) | 2 m packing height |
| Column section (106) above the raffinate zone | 0.5 m packing height. |

The stripper column 102 contained one structured packing with a total height of 3 m, whereby 1 m packing height fell to the stripping part 118 and 2 m packing height to the updraft part 117.

The rectifying column 201 designed as defined by the invention according to FIG. 2 also had a column diameter of 72 mm and was equipped with structured packings that were divided and distributed to the column sections as follows:

| | |
|---|---|
| Column stripping section (222) | 1 m packing height |
| Stripping part of main column section (216) | 3 m packing ht |
| Parallel chamber (217) of column main section | 2 m packing ht |
| Raffinate section (205) | 2 m packing ht |
| Top column section (206) for raffinate purification | 0.5 m packing height. |

EXAMPLE 1

Tested was the production of pure benzene from a C6-cut of fully hydrated pyrolysis benzine. The charged mixture had the following composition:

| | |
|---|---|
| C5-paraffins | 0.04% by weight |
| Cyclopentane | 3.49% by weight |
| C6-paraffins | 14.34% by weight |
| Methylcyclopentane | 10.15% by weight |
| Benzene | 63.02% by weight |
| Cyclohexane | 3.93% by weight |
| C7-paraffins | 3.49% by weight |
| Dimethylcyclopentane | 1.34% by weight |
| Methylcyclohexane | 0.20% by weight |
| Toluene | <0.01% by weight |
| Sum | 100.00% by weight |

N-formylmorpholine was used as the selective solvent. The table below shows by a comparative representation the results of extractive distillation in a plant (I) according to the prior art with two columns, and in the rectifying column (II) as defined by the invention.

| Example 1 | | I | II |
|---|---|---|---|
| Quantity charged | kg/h | 3.49 | 3.50 |
| Extracting agent charged | kg/h | 12.00 | 12.00 |
| Raffinate quantity (conduits 103, 203) | kg/h | 1.32 | 1.31 |
| Raffinate reflux | kg/h | 0.65 | 0.66 |
| Product quantity (conduits 124, 232) | kg/h | 2.17 | 2.19 |
| Product reflux | kg/h | 1.09 | 0.55 |
| Heating energy consumption for column 101 | W | 394 | |
| Heating energy consumption for stripping column 102 | W | 566 | |
| Heating energy consumption for both columns | W | 960 | |
| Heating energy consumption for column 201 according to invention | W | | 804 |
| Reduction in heating energy consumption when using the rectifying column of the invention as compared to the conventional column connection | % | | 16.3 |
| Benzene yield | % | 99.3 | 99.4 |
| Benzene purity | | | |
| Non-aromatics | ppm | 68 | 69 |
| Toluene | ppm | 7 | 6 |
| Solvent | ppm | <1 | <1 |

EXAMPLE 2

Tested was the production of pure benzene and toluene with nitrating quality from a C7-cut from catalytic reformate. The charged mixture had the following composition:

| | |
|---|---|
| C5-paraffins | 18.70% by weight |
| C5-olefins | 0.65% by weight |
| Cyclopentane | 0.39% by weight |
| C6-paraffins | 2.13% by weight |
| C6-olefins | 0.01% by weight |
| Methylcyclopentane | 0.05% by weight |
| Benzene | 8.40% by weight |
| C7-paraffins | 14.75% by weight |
| C7-olefins | 0.10% by weight |
| C7-naphthenes | 0.15% by weight |
| C8-paraffins | 0.70% by weight |
| C8-naphthenes | 0.04% by weight |
| Toluene | 53.27% by weight |
| C8-aromatics | 0.63% by weight |
| C9-paraffins | 0.03% by weight |
| Sum | 100.00% by weight |

N-formylmorpholine was used as the selective solvent in the extractive distillation. The table below shows by comparative representation the results of the extractive distillation in the plant (I) according to the prior art with two columns, and in the rectifying column (II) as defined by the invention. Shown are the substance streams, the heating energy consumption as well as the composition of the aromatics product withdrawn via product conduits 124 and, respectively, 232. With almost identical values for the benzene yield, the toluene yield and the composition of the aromatics product, the rectifying column as defined by the invention permits a distinct reduction of the heating energy consumption by 17.9%.

| Example 2 | | I | II |
|---|---|---|---|
| Quantity charged | kg/h | 5.59 | 5.59 |
| Extracting agent charged | kg/h | 14.00 | 14.00 |
| Raffinate quantity (conduit 103, 203) | kg/h | 2.11 | 2.10 |
| Raffinate reflux | kg/h | 1.05 | 1.05 |
| Product quantity (conduit 124, 232) | kg/h | 3.49 | 3.48 |
| Product reflux | kg/h | 0.77 | 0.79 |
| Heating energy consumption for column 101 | W | 556 | |
| Heating energy consumption for stripping column 102 | W | 707 | |
| Total heating energy consumption for both columns | W | 1263 | |
| Heating energy consumption for Column 201 according to the invention | W | | 1037 |
| Reduction in heating energy consumption when using the rectifying column as defined by the invention compared to the conventional column connections | % | | 17.9 |

In a fractionating distillation step downstream it is possible to separate the product of pure aromatics into pure benzene and toluene with nitrating quality.

EXAMPLE 3

Tested was the production of pure benzene from a C6-cut from catalytic reformate. The charged mixture had the following composition:

| C5-paraffin | 12.06% by weight |
|---|---|
| Cyclopentane | 0.11% by weight |
| C6-paraffin | 48.74% by weight |
| Methylcyclopentane | 0.91% by weight |
| Benzene | 28.53% by weight |
| Cyclohexane | 0.69% by weight |
| C7-paraffin | 8.81% by weight |
| Dimethylcyclopentane | 0.09% by weight |
| 1-heptene | 0.06% by weight |
| Toluene | 20 ppm |
| Sum | 100.00% by weight |

N-formylmorpholine was used as the selective solvent in the extractive distillation. The following table shows a comparative representation of the results of the extractive distillation in a plant (I) according to the prior art with two columns, and in the rectifying column (II) as defined by the invention. Stated are the substance currents, the heating energy consumption, the benzene yield and the purity of the product. With nearly identical values for the product yield and the purity of the product, the operation of the rectifying column as defined by the invention requires heating energy that is distinctly lower by 29.2% as compared to the wattage required by the plant according to the prior art.

| Example 3 | | I | II |
|---|---|---|---|
| Quantity charged | kg/h | 5.21 | 5.20 |
| Extracting agent charged | kg/h | 11.98 | 12.00 |
| Raffinate quantity (conduit 103, 203) | kg/h | 3.73 | 3.73 |
| Raffinate reflux | kg/h | 1.86 | 1.85 |
| Product quantity (conduit 124, 232) | kg/h | 1.48 | 1.50 |
| Product reflux | kg/h | 1.92 | 0.28 |
| Energy consumption for column 101 | W | 725 | |
| Energy consumption for stripping column 102 | W | 495 | |
| Sum of heating energy for both columns | W | 1220 | |
| Energy consumption for column 201 according to the invention | W | | 864 |
| Reduction in heating energy consumption when using the rectifying column as defined by the invention as compared to the conventional column connection | % | | 29.2 |
| Benzene yield | % | 99.5 | 99.5 |
| Benzene purity | | | |
| Non-aromatics | ppm | 4 | 6 |
| Toluene | ppm | 8 | 70 |
| Solvent | ppm | <1 | <1 |

What is claimed is:

1. A rectifying column for extractive distillation of close-boiling or azeotropic boiling mixtures, comprising a column main section (204) having two chambers (216, 217) connected in parallel;

a raffinate section (205) located above the column main section;

an evaporating device (208) located at a lower end of the column and having at least one evaporator (209);

an arrangement (210) at a cap of the column with a raffinate drain (211), a condenser (212) and a device (213) for partly recycling the raffinate liquefied in the condenser;

an inlet (214) located between the column main section (204) and the raffinate section (205) for feeding a starting mixture to be separated; and a solvent inlet located on a top side of the raffinate section for charging an extracting agent;

wherein the chamber (216) of the column main section is open at the top and bottom sides and contains installations (207) designed as a stripping section with a plurality of separation stages for separating the raffinate from a mixture containing the extracting agent; and wherein the other chamber (217) is closed at the top side against the interior of the column and open at the bottom side and contains installations (207) having devices (218, 219) in a space above the installations for withdrawing a substantially extracting agent-free product in a gaseous state and for recycling a liquefied partial product stream; a column sump (221) connected at the lower end of the column with a solvent inlet (215) by a device (223) for withdrawing and recycling extracting agent; a column stripping section (222) with a plurality of theoretical separation stages arranged between the column sump (221) and the column main section (204), in which stripping section concentration of the extracting agent takes place from the top down; a catching tray (231) permeable to gas arranged below the column main section (204), a drain for liquid of said catching tray being connected to a continuous-flow heater (230) for heating liquid draining from the two chambers (216, 217) of the column main section (204), wherein the heated mixture exiting from the continuous-flow heater (230) can be fed below the catching tray (231) into the stripping section (222) of the column.

2. The rectifying column according to claim 1, wherein the continuous-flow heater (230) is heated by heat exchange with the extracting agent withdrawn from the column sump (221).

3. The rectifying column according to claim 1, wherein the column main section (204) is designed as a cylindrical column passage, the latter being installed between a column section forming the raffinate section (205) and the column stripping section (222) and containing an insert (224) forming the chamber (217) being closed on the top side.

4. The rectifying column according to claim 3, wherein the insert (224) consists of a partition (225) connected with a jacket of the column passage and extending in the longitudinal direction of the column, and a cover (226) connected with the partition (225) and the jacket of the column passage.

5. The rectifying column according to claim 1, wherein catching tray (227) for liquid is arranged between the raffinate section (205) and the column main section (204), said catching tray being permeable to gas, whereby a liquid distributor (228) is connected to the catching tray (227) for feeding the draining liquid to the installations (207) of the chamber (216) of the column main section (204) that is open on the top side.

6. The rectifying column according to claim 1, wherein a column section with a plurality of theoretical separation stages is arranged above the raffinate zone (205) for the purification of the raffinate, said column section extending from the solvent inlet (215) up to the cap of the column.

* * * * *